United States Patent
Gorsica, IV et al.

(10) Patent No.: US 12,041,034 B2
(45) Date of Patent: *Jul. 16, 2024

(54) CONTROLLING COMPUTING DEVICE VIRTUAL PRIVATE NETWORK USAGE WITH A WEARABLE DEVICE

(71) Applicant: Motorola Mobility LLC, Chicago, IL (US)

(72) Inventors: John J. Gorsica, IV, Round Lake, IL (US); Rachid M. Alameh, Crystal Lake, IL (US); Jarrett K. Simerson, Glenview, IL (US); Robert S. Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 361 days.

This patent is subject to a terminal disclaimer.

(21) Appl. No.: 17/358,564

(22) Filed: Jun. 25, 2021

(65) Prior Publication Data

US 2021/0320904 A1  Oct. 14, 2021

Related U.S. Application Data

(63) Continuation of application No. 16/394,327, filed on Apr. 25, 2019, now Pat. No. 11,082,402.

(51) Int. Cl.
*H04L 9/40* (2022.01)
*G06F 21/35* (2013.01)
(Continued)

(52) U.S. Cl.
CPC .......... *H04L 63/0272* (2013.01); *G06F 21/35* (2013.01); *H04L 12/4641* (2013.01);
(Continued)

(58) Field of Classification Search
None
See application file for complete search history.

(56) References Cited

U.S. PATENT DOCUMENTS

| | | |
|---|---|---|
| 9,092,969 B2 | 7/2015 | McCown et al. |
| 9,355,231 B2 | 5/2016 | Disraeli |

(Continued)

FOREIGN PATENT DOCUMENTS

| | | |
|---|---|---|
| EP | 3291167 | 7/2018 |
| EP | 2992692 | 8/2018 |

OTHER PUBLICATIONS

U.S. Appl. No. 16/394,307 , "Corrected Notice of Allowability", U.S. Appl. No. 16/394,307, filed Nov. 10, 2022, 14 pages.

(Continued)

*Primary Examiner* — Joseph P Hirl
*Assistant Examiner* — Hassan Saadoun
(74) *Attorney, Agent, or Firm* — FIG. 1 Patents

(57) ABSTRACT

A wearable device enables access to VPN endpoint devices for secure data communication and privacy for a computing device. The wearable device stores VPN configuration information for a user, which includes the user's VPN credentials for each of one or more remote VPN endpoint devices. When the wearable device is in close proximity to a computing device and is being worn by a user that is authenticated to at least one of the wearable device and the computing device, the wearable device communicates the configuration information to the computing device. The computing device can then use this VPN configuration information to establish a VPN connection to a VPN endpoint device.

20 Claims, 6 Drawing Sheets

(51) Int. Cl.
*H04L 12/46* (2006.01)
*H04W 12/06* (2021.01)
*H04W 12/33* (2021.01)
*H04W 12/63* (2021.01)
*G06F 1/16* (2006.01)

(52) U.S. Cl.
CPC ......... *H04L 63/0823* (2013.01); *H04W 12/06* (2013.01); *H04W 12/33* (2021.01); *H04W 12/63* (2021.01); *G06F 1/163* (2013.01)

(56) References Cited

U.S. PATENT DOCUMENTS

| | | |
|---|---|---|
| 10,380,425 B2 | 8/2019 | Wexler et al. |
| 10,386,960 B1 | 8/2019 | Smith |
| 10,701,067 B1 | 6/2020 | Ziraknejad et al. |
| 10,963,586 B1 | 3/2021 | Sculley et al. |
| 11,455,411 B2 | 9/2022 | Alameh et al. |
| 11,562,051 B2 | 1/2023 | Alameh et al. |
| 2005/0221798 A1 | 10/2005 | Sengupta et al. |
| 2007/0067738 A1 | 3/2007 | Flynt et al. |
| 2008/0186162 A1 | 8/2008 | Rajan et al. |
| 2011/0214158 A1 | 9/2011 | Pasquero et al. |
| 2013/0225309 A1 | 8/2013 | Bentley et al. |
| 2013/0254401 A1 | 9/2013 | Marshall et al. |
| 2014/0033326 A1 | 1/2014 | Chien |
| 2014/0129231 A1 | 5/2014 | Herring et al. |
| 2015/0070461 A1 | 3/2015 | Nace et al. |
| 2015/0161701 A1 | 6/2015 | Bretscher et al. |
| 2015/0178822 A1 | 6/2015 | Babiarz et al. |
| 2015/0288719 A1* | 10/2015 | Freudiger ........... H04L 63/0272 726/12 |
| 2015/0310434 A1 | 10/2015 | Cheung |
| 2015/0370323 A1 | 12/2015 | Cieplinski et al. |
| 2015/0373050 A1 | 12/2015 | Dayan et al. |
| 2015/0381633 A1 | 12/2015 | Grim et al. |
| 2016/0011767 A1 | 1/2016 | Jung et al. |
| 2016/0050209 A1 | 2/2016 | Govande et al. |
| 2016/0055324 A1 | 2/2016 | Agarwal |
| 2016/0164865 A1 | 6/2016 | Speicher et al. |
| 2016/0224779 A1* | 8/2016 | Kitane ................ H04L 63/0861 |
| 2016/0253141 A1 | 9/2016 | Sarkar et al. |
| 2016/0255068 A1 | 9/2016 | Pritchard et al. |
| 2016/0378302 A1 | 12/2016 | Gilger et al. |
| 2017/0041789 A1* | 2/2017 | Waldron ............ G06K 19/0716 |
| 2017/0116846 A1* | 4/2017 | Wengrovitz ....... H04M 1/72412 |
| 2017/0193303 A1 | 7/2017 | Wexler et al. |
| 2018/0137681 A1 | 5/2018 | Chang et al. |
| 2018/0217966 A1 | 8/2018 | Buttolo et al. |
| 2018/0350144 A1 | 12/2018 | Rathod |
| 2019/0089831 A1 | 3/2019 | Medlen et al. |
| 2019/0171806 A1* | 6/2019 | Embrechts ............ H04W 12/33 |
| 2019/0182670 A1 | 6/2019 | Maragoudakis |
| 2019/0205010 A1 | 7/2019 | Fujii et al. |
| 2019/0243989 A1 | 8/2019 | Kalva et al. |
| 2019/0286298 A1 | 9/2019 | Wantland et al. |
| 2019/0373472 A1 | 12/2019 | Smith et al. |
| 2020/0285752 A1 | 9/2020 | Wyatt et al. |
| 2020/0304445 A1 | 9/2020 | Dinhthi et al. |
| 2020/0342076 A1 | 10/2020 | Alameh et al. |
| 2020/0342133 A1 | 10/2020 | Alameh et al. |
| 2020/0342144 A1 | 10/2020 | Alameh et al. |
| 2020/0344213 A1 | 10/2020 | Gorsica et al. |

OTHER PUBLICATIONS

U.S. Appl. No. 16/394,307, "Notice of Allowance", U.S. Appl. No. 16/394,307, filed Oct. 28, 2022, 17 pages.
"Final Office Action", U.S. Appl. No. 16/394,290, filed Mar. 1, 2022, 11 pages.
"Final Office Action", U.S. Appl. No. 16/394,307, filed Mar. 29, 2022, 18 pages.
"Android Developers—Docs—Guides—VPN", Retrieved at: https://developer.android.com/guide/topics/connectivity/vpn—on Mar. 20, 2019, 12 pages.
"Corrected Notice of Allowability", U.S. Appl. No. 16/394,327, filed Jul. 6, 2021, 2 pages.
"Final Office Action", U.S. Appl. No. 16/394,264, filed Mar. 18, 2021, 44 pages.
"Lock your Windows 10 PC automatically when you step away from it", Retrieved at: https://support.microsoft.com/en-us/help/4028111/windows-lock-your-windows-10-pc-automatically-when-you-step-away-from—on Apr. 19, 2019, 2 pages.
"Locly Native App Platform", Retrieved at: https://locly.com/—on Apr. 19, 2019, 15 pages.
"Non-Final Office Action", U.S. Appl. No. 16/394,307, filed Sep. 15, 2021, 10 pages.
"Non-Final Office Action", U.S. Appl. No. 16/394,327, filed Nov. 24, 2020, 18 pages.
"Non-Final Office Action", U.S. Appl. No. 16/394,264, filed Oct. 5, 2020, 46 pages.
"Non-Final Office Action", U.S. Appl. No. 16/394,290, filed Jul. 6, 2021, 9 pages.
"Notice of Allowance", U.S. Appl. No. 16/394,327, filed Apr. 14, 2021, 13 pages.
"Notice of Allowance", U.S. Appl. No. 16/394,264, filed Apr. 23, 2021, 20 pages.
"Restriction Requirement", U.S. Appl. No. 16/394,307, filed May 19, 2021, 7 pages.
"Supplemental Notice of Allowability", U.S. Appl. No. 16/394,264, filed Jul. 22, 2021, 3 pages.
Sprager, Sebastijan et al., "Inertial Sensor-Based Gait Recognition: A Review", Sep. 2, 2015, pp. 22090-22127.
U.S. Appl. No. 16/394,290, "Notice of Allowance", U.S. Appl. No. 16/394,290, filed Jun. 17, 2022, 7 pages.
U.S. Appl. No. 16/394,290, "Supplemental Notice of Allowability", U.S. Appl. No. 16/394,290, filed Aug. 31, 2022, 4 pages.
U.S. Appl. No. 16/394,307, "Non-Final Office Action", U.S. Appl. No. 16/394,307, filed Jul. 18, 2022, 20 pages.

* cited by examiner

CONTROLLING COMPUTING DEVICE VIRTUAL PRIVATE NETWORK USAGE WITH A WEARABLE DEVICE

RELATED APPLICATIONS

This application is a continuation of and claims priority to U.S. patent application Ser. No. 16/394,327, filed Apr. 25, 2019, entitled "Controlling Computing Device Virtual Private Network Usage With A Wearable Device", the entire disclosure of which is hereby incorporated by reference herein in its entirety.

BACKGROUND

As technology has advanced, computing devices have become increasingly commonplace in our lives. For example, many people have mobile devices such as phones or tablets that they carry with them and use throughout the day, oftentimes to communicate confidential information. Virtual private networks (VPNs) have been developed to allow for secure communication with a remote device across a public network. VPNs allow a person to use his or her computing device to communicate confidential information over a public network (e.g., using a public Wi-Fi network) and have the communication remain secure despite the public nature of the network.

While VPNs have many benefits, they are not without their problems. One such problem is that creating a VPN connection to a remote device involves the user using his or her credentials to manually log into a remote VPN server every time he or she wants to access the remote VPN server. This can be a tedious process for many users, leading to user dissatisfaction with their devices.

BRIEF DESCRIPTION OF THE DRAWINGS

Embodiments of controlling computing device virtual private network usage with a wearable device are described with reference to the following drawings. The same numbers are used throughout the drawings to reference like features and components.

DETAILED DESCRIPTION

Figure 1:
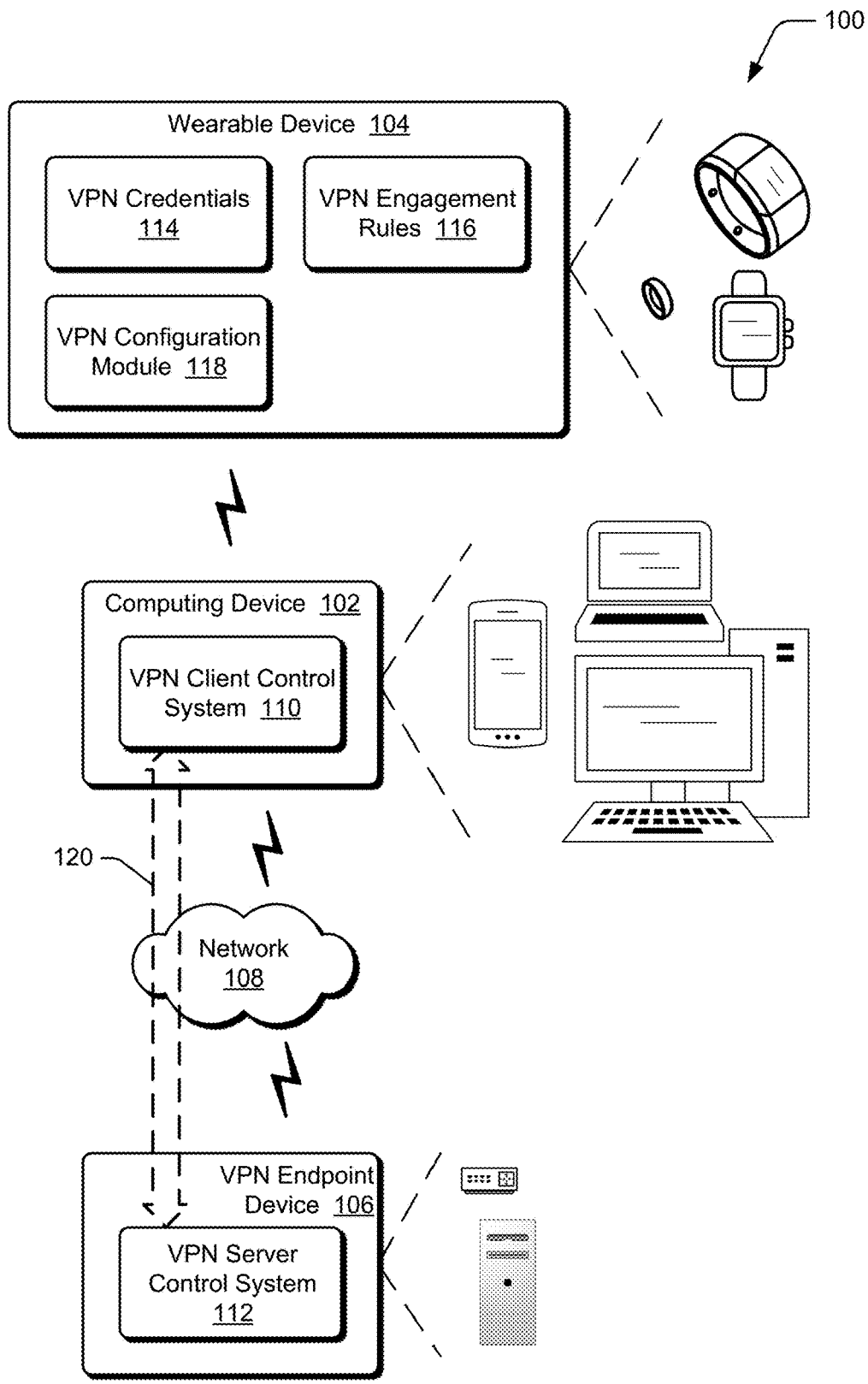
FIG. 1 illustrates an example environment in which the techniques discussed herein can be used.

Controlling computing device virtual private network usage with a wearable device is discussed herein. The wearable device enables worldwide access to VPN servers or other VPN endpoint devices for secure data communication and privacy for a computing device. The wearable device stores VPN configuration information for the user, which includes the user's VPN credentials for each of one or more remote VPN endpoint devices, such as VPN servers, VPN routers, and so forth. When the wearable device is in close proximity to a computing device and is being worn by a user that is authenticated to at least one of the wearable device and the computing device, the wearable device communicates the configuration information including the user's VPN credentials to the computing device. The computing device can then use these VPN credentials to establish a VPN connection to a remote device.

The wearable device also stores engagement rules that are applied to determine, in situations where a wearable device that is being worn by a user is in close proximity to the computing device and the user has been authenticated to at least one of the wearable device and the computing device, when to establish and use a VPN connection. The rules can include, for example, a safe networks list identifying networks that are deemed safe, so a computing device need not establish a VPN connection when connected to such networks. By way of another example, the rules can also include a safe locations list identifying locations (e.g., geographic or other areas) that are deemed safe, so a computing device need not establish a VPN connection at such locations. By way of another example, the rules can also include an applications list identifying applications on the computing device that are to use a trusted connection to communicate data to a remote device.

In one or more embodiments, the wearable device provides the engagement rules to the computing device and the computing device applies the engagement rules based on computing device context to determine whether to establish and use a VPN connection. The computing device context refers to the environment or setting of the computing device, such as an identifier of a network the computing device is connected to or can connect to, where the computing device is located, and so forth. Additionally or alternatively, the computing device can provide the computing device context to the wearable device, and the wearable device determines whether the computing device is to establish and use a VPN connection. The wearable device then provides an indication to the computing device whether to establish and use a VPN connection.

In situations where a VPN connection has been established and then the wearable device is no longer being worn by the user, or the wearable device is no longer in close proximity to the computing device, or the user is no longer authenticated to both the wearable device and the computing device, the computing device terminates the VPN connection. Similarly, if the computing device context changes, the computing device terminates the VPN connection if the engagement rules indicate a VPN connection is not to be established given the new computing device context. If communication of data over a trusted connection is needed and the VPN connection is terminated, the computing device delays communicating the data until a VPN connection can again be established.

The techniques discussed herein enhance the security of a computing device, providing for secure communication over a VPN connection in situations where a wearable device that is being worn by a user is in close proximity to the computing device and the user has been authenticated to at least one of the wearable device and the computing device. The secure communication is performed automatically without need for the user to manually log into a remote VPN server or a remote VPN router. Furthermore, the techniques discussed herein allow the VPN connection to be established automatically without requiring the user to request that the VPN connection be established.

FIG. 1 illustrates an example environment 100 in which the techniques discussed herein can be used. The environment 100 includes a computing device 102, a wearable device 104, and a VPN endpoint device 106. The computing device 102 can be, or include, many different types of computing or electronic devices. For example, the computing device 102 can be a mobile device designed to be easily carried by a user, such as a smartphone or other wireless phone, a notebook computer (e.g., netbook or ultrabook), a laptop computer, an augmented reality headset or device, a virtual reality headset or device, a tablet or phablet computer, an entertainment device (e.g., a gaming console, a portable gaming device, a streaming media player, a digital video recorder, a music or other audio playback device), and so forth. By way of further example, the computing device 102 can be a device designed to be more stationary than mobile, such as a desktop computer, a television, a television set-top box, and so forth.

The wearable device 104 can be, or include, many different types of portable computing or electronic devices. The wearable device 104 is a device designed to be worn by a user or regularly carried by a user. For example, the wearable device 104 can be a smartwatch, an augmented reality headset or device, a virtual reality headset or device, jewelry (e.g., a ring, a bracelet, a necklace), a fitness tracker, a key fob, and so forth. E.g., the computing device 102 can be a smartphone and the wearable device 104 can be a smartwatch. By way of further example, the wearable device 104 can be a mobile device, particularly in situations where the computing device 102 is a stationary device. E.g., the computing device 102 can be a desktop computer and the wearable device 104 can be a smartphone.

The VPN endpoint device 106 can be any of a variety of types of VPN endpoint devices accessible to the computing device 102 via a network 108. For example, the VPN endpoint device 106 can be a tower server, a rack server, a desktop computing device, a VPN router, and so forth. The network 108 can include any of a variety of different networks, such as the Internet, Wi-Fi networks, wired networks, and so forth.

The wearable device 104 includes VPN credentials 114, VPN engagement rules 116, and a VPN configuration module 118. The VPN credentials 114 are credentials used to establish a VPN connection with the VPN endpoint device 106. The VPN credentials 114 include, for example, VPN account information (e.g., user name and password), a VPN token, and so forth. Although a single VPN endpoint device 106 is illustrated in the environment 100, additionally or alternatively the wearable device 104 can include VPN credentials 114 for multiple VPN endpoint devices, allowing VPN connections to be established with multiple different VPN endpoint devices.

The VPN engagement rules 116 are applied to determine when to establish and use a VPN connection in situations where the wearable device 104 is being worn by a user and is in close proximity to the computing device 102, and the user has been authenticated to at least one of the wearable device 104 and the computing device 102. The VPN engagement rules 116, also referred to as simply engagement rules, can include any of a variety of engagement rules as discussed in more detail below. The engagement rules 116 can be applied by one or both of the wearable device 104 and the computing device 102 as discussed in more detail below.

The VPN configuration module 118 manages the transfer of the VPN credentials 114 to the computing device 102 at the appropriate times. In situations in which the wearable device 104 applies the engagement rules 116, the VPN configuration module 118 also applies the engagement rules 116. In situations in which the computing device 102 applies the engagement rules 116, the VPN configuration module 118 also transfers the engagement rules 116 to the computing device 102. In one or more embodiments, the VPN configuration module 118 transfers the VPN credentials 114 to the computing device 102 only in response to determining that the wearable device 104 is in close proximity to the computing device 102 and is being worn by a user that is authenticated to at least one of the wearable device 104 and the computing device 102.

The computing device 102 includes a VPN client control system 110, and the VPN endpoint device 106 includes a VPN server control system 112. The VPN client control system 110 establishes a VPN connection 120 to the VPN server control system 112, allowing secure communication between the computing device 102 and the VPN endpoint device 106 over the network 108. The VPN connection 120 is established and used by the computing device 102 and the VPN endpoint device 106 in situations where the wearable device 104 is being worn by a user, the wearable device 104 is in close proximity to the computing device 102, the user has been authenticated to at least one of the wearable device 104 and the computing device 102, and the VPN engagement rules 116 indicate to establish and use a VPN connection.

The VPN connection 120 is established with the VPN credentials 114 obtained from the wearable device 104. Given the VPN credentials 114, the VPN connection 120 can be established using any of a variety of public and/or proprietary techniques.

The wearable device 104 is associated with the computing device 102. In one or more embodiments, the wearable device 104 is associated with the computing device 102 by pairing the wearable device 104 with the computing device 102 (e.g., using Bluetooth pairing). Additionally or alternatively, this association can be made in other manners. For example, the owner of the wearable device 104 and the computing device 102 can manually input to the computing device 102 an identifier of the wearable device 104, and manually input to the wearable device 104 an identifier of the computing device 102.

The wearable device 104 is also associated with a particular user of the computing device 102. This association can be implicit. For example, when the wearable device 104 is associated with the computing device 102, the user is logged into the computing device 102 (e.g., using his or her name and password, using a scanned fingerprint, using a personal identification number (PIN)). The user that logged into the computing device 102 when the wearable device 104 was paired with the computing device 102 is the user associated with the wearable device 104. The computing device 102 can, for example, pass an identifier of the user to the wearable device 104.

Additionally or alternatively, this association of the wearable device 104 with a particular user of the computing device 102 can also be explicit. For example the user can authenticate himself or herself to both the wearable device 104 and the computing device 102 (e.g., using his or her name and password, using a scanned fingerprint, using a PIN). The wearable device 104 and the computing device 102 can then communicate with each other and verify that the same user (e.g., same user identifier) has authenticated himself or herself to both the wearable device 104 and the computing device 102. Additionally or alternatively, the user need authenticate himself or herself to only one of the wearable device 104 and the computing device 102 if the wearable device 104 is in close proximity to the computing device 102. For example, the user can authentication himself or herself to the wearable device 104, which then communicates with the computing device 102 letting the computing device 102 know that the user has been authenticated, or the user can authentication himself or herself to the computing device 102, which then communicates with the wearable device 104 letting the wearable device 104 know that the user has been authenticated.

Figure 2:
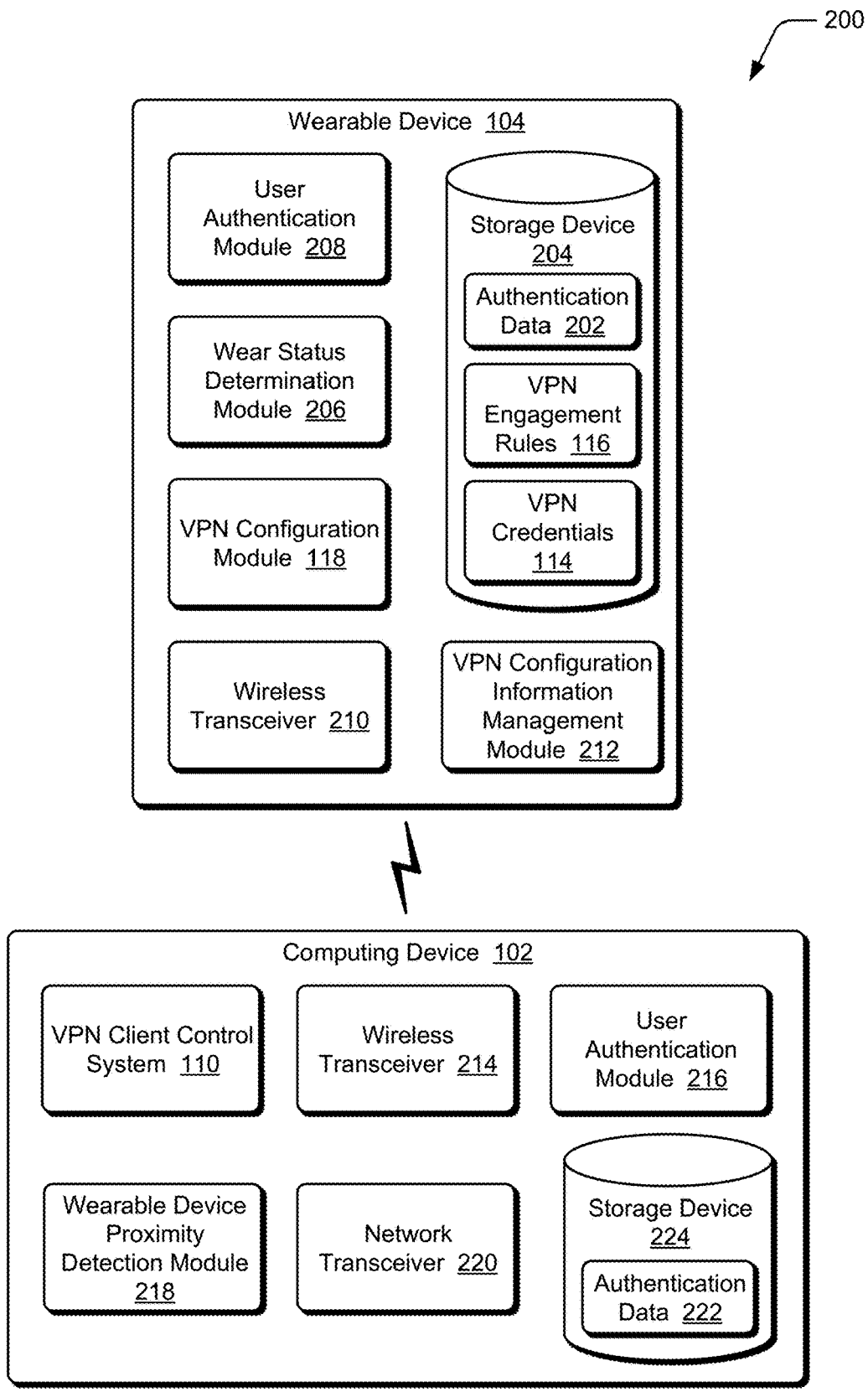
FIG. 2 illustrates an example of a wearable device and a computing device in additional detail.

FIG. 2 illustrates an example 200 of the wearable device 104 and the computing device 102 in additional detail. The wearable device 104 includes the VPN credentials 114, the VPN engagement rules 116, and authentication data 202 stored in a storage device 204. The storage device 204 can be any of a variety of different storage devices or components, such as random access memory (RAM), Flash memory, magnetic disk, and so forth. The wearable device 104 also includes the VPN configuration module 118, a wear status determination module 206, a user authentication module 208, a wireless transceiver 210, and a VPN configuration information management module 212. The computing device 102 includes the VPN client control system 110, a wireless transceiver 214, a user authentication module 216, a wearable device proximity detection module 218, a network transceiver 220, and authentication data 222 stored in a storage device 224. The storage device 222 can be any of a variety of different storage devices or components, such as RAM, Flash memory, magnetic disk, and so forth.

The VPN client control system 110 can establish and use a VPN connection in situations where the wearable device 104 is being worn by a user, the wearable device 104 is in close proximity to the computing device 102, the user has been authenticated to at least one of the wearable device 104 and the computing device 102, and the VPN engagement rules 116 indicate to establish and use a VPN connection. In one or more embodiments, the VPN client control system 110 establishes a VPN connection in response to launching of an application or program on the computing device 102 that communicates data over a network. Thus, the VPN connection is established for use when needed by the application or program. Which applications or programs communicate data over a network can be determined in any of a variety of different manners, such as accessing a list or other record of which applications or programs access the network, from a record or list in the computing device 102 that specifies permissions and indicates which applications or programs have permission to access the network transceiver 220, and so forth.

Additionally or alternatively, the VPN client control system 110 establishes and uses the VPN connection at other times. For example, regardless of whether an application or program that communicates data over a network is running on the computing device 102, the VPN client control system 110 can establish a VPN connection whenever the wearable device 104 is being worn by a user, the wearable device 104 is in close proximity to the computing device 102, the user has been authenticated to both the wearable device 104 and the computing device 102, and the VPN engagement rules 116 indicate to establish and use a VPN connection.

The wireless transceiver 210 and the wireless transceiver 214 manage wireless communication between the wearable device 104 and the computing device 102. The wireless transceivers 210 and 214 can implement any of a variety of public and/or proprietary communication technologies, such as Bluetooth. The wireless transceivers 210 and 214 establish a secure connection or communication channel with each other, such as by using encryption. This allows information (such as the VPN credentials 114) to be securely communicated between the wearable device 104 and the computing device 102. Although discussed herein as wireless communication, additionally or alternatively the wearable device 104 and the computing device 102 can communicate via a wired connection.

The wear status determination module 206 determines whether the wearable device 104 is being worn by a user (e.g., as opposed to just resting on a table). The wear status determination module 206 can determine whether the wearable device 104 is being worn by a user in various different manners, such as sensing a heart rate, sensing a particular temperature (e.g., between 98 degrees Fahrenheit and 100 degrees Fahrenheit), capacitance detecting skin conductivity, detecting motion consistent with arm movements (e.g., in situations where the wearable device 104 is worn on the user's arm or hand), and so forth.

Although the wear status determination module 206 is illustrated as being part of the wearable device 104, additionally or alternatively the wear status determination module 206 can be implemented on the computing device 102. In such situations, sensors on the wearable device 104 detect data (e.g., heart rate, temperature, motion) and send the data to the computing device 102 to determine whether the wearable device 104 is being worn by a user.

The user authentication module 208 authenticates the user to the wearable device 104. The user can be authenticated using any of a variety of different authentication mechanisms, such as a fingerprint sensor, face recognition, iris recognition, voice recognition, password or PIN, and so forth. The user authentication module 208 obtains input authentication data from the user (e.g., data describing the user's fingerprint obtained by the fingerprint sensor, an input password or pin, etc.) and compares the input authentication data to known authentication data 202 for the user. If the input authentication data matches (e.g., is the same as, or is within a threshold amount (e.g., 90%) of being the same as) the known authentication data 202 for the user, the user is authenticated. Otherwise, the user is not authenticated.

It should be noted that the authentication module 208 can be a background input rather than an active or affirmative input by the user. For example, the authentication module 208 can authenticate the user based on data describing a user's gait, posture, and so forth measured by motion sensors worn or carried by the user (e.g., in the wearable device 104 or elsewhere).

Similarly, the user authentication module 216 authenticates the user to the computing device 102. Analogous to the user authentication module 208, the user authentication module 216 can authenticate the user using any of a variety of different authentication mechanisms. The user authentication module 216 obtains input authentication data from the user (e.g., data describing the user's fingerprint obtained by the fingerprint sensor, an input password or pin, etc.) and compares the input authentication data to known authentication data 222 for the user. If the input authentication data matches (e.g., is the same as, or is within a threshold amount (e.g., 90%) of being the same as) the known authentication data 222 for the user, the user is authenticated. Otherwise, the user is not authenticated.

In one or more embodiments, such as if the wearable device 104 is not in close proximity to the computing device 102, the user authentication module 208 and the user authentication module 216 communicate with each other to verify that they have both authenticated the same user. For example, the authentication data 202 may be associated with a particular user name or identifier, and the authentication data 222 may also be associated with a particular user name or identifier. The user authentication module 208 and the user authentication module 216 communicate with each other to verify that they both authenticated the same particular user name or identifier. The VPN configuration module 118 provides the VPN credentials 114 to the computing device 102 only in response to the same user being authenticated by the user authentication module 208 and the user authentication module 216.

Additionally or alternatively, if the wearable device 104 is in close proximity to the computing device 102, the user authentication module 208 and the user authentication module 216 communicate with each other to verify that the user has been authenticated to only one of the wearable device 104 and the computing device 102. For example, one of the user authentication module 208 and the user authentication module 216 authenticates the user and notifies the other that the user has been authenticated. The VPN configuration module 118 provides the VPN credentials 114 to the computing device 102 only in response to the user being authenticated by at least one of the user authentication module 208 and the user authentication module 216.

The wearable device proximity detection module 218 determines whether the wearable device 104 is in close proximity to the computing device 102. The wearable device proximity detection module 218 can determine whether the wearable device 104 is in close proximity to the computing device 102 in a variety of different manners. In one or more embodiments, a wearable device 104 being in close proximity to the computing device 102 refers to the wearable device 104 being within a threshold distance of the computing device 102. This threshold distance can vary and is optionally user-configurable. This threshold distance can also vary based on the computing device 102 (e.g., 2 feet if the computing device 102 is a smartphone, 10 feet if the computing device 102 is a desktop computer). For example, this threshold distance can range from 2 feet to 10 feet.

In one or more embodiments, the wearable device 104 is determined to be in close proximity to the computing device 102 if the wearable device 104 is within range to communicate with the computing device 102 using a particular communication protocol (e.g., Bluetooth, Bluetooth Low Energy).

Additionally or alternatively, the distance between the wearable device 104 and the computing device 102 can be determined. This distance between the wearable device 104 and the computing device 102 can be determined in a variety of different manners. For example, global positioning system (GPS) coordinates can be obtained by the wearable device 104 and provided to the wearable device proximity detection module 218, which also receives GPS coordinates obtained by the computing device 102. The wearable device proximity detection module 218 compares the two GPS coordinates and determines a distance between them.

Additionally or alternatively, rather than relying on the wearable device 104 being within a threshold distance of the computing device 102, the wearable device proximity detection module 218 can determine whether the wearable device 104 is in close proximity to the computing device 102 in various other manners. For example, the wearable device 104 can detect a signal such as a beacon (e.g., a nearby location beacon) and provide the location indicated in that beacon (such as via signal strength or an identifier of the signal) to the computing device 102. The wearable device proximity detection module 218 determines that, if the computing device 102 detects a location beacon indicating the same location as in the signal detected by the wearable device 104 (or detects the same beacon as the wearable device 104), then the wearable device 104 is in close proximity to the computing device 102 (e.g., the mere reception of the same short range beacon by both the computing device 102 and the wearable device 104 can indicate that the wearable device 104 is in close proximity to the computing device 102).

By way of another example, the wearable device 104 can detect a wireless signal (e.g., Wi-Fi signal) having a particular identifier (e.g., basic service set identifier (BSSID)) and signal strength (e.g., received signal strength indicator (RSSI) value). The wearable device 104 communicates that wireless signal identifier and signal strength to the computing device 102. The computing device 102 can also detect a wireless signal having a particular identifier and signal strength. The wearable device proximity detection module 218 determines that, if the wearable device 104 and the computing device 102 both detect a wireless signal having the same particular identifier and signal strength, then the wearable device 104 is in close proximity to the computing device 102.

By way of another example, one of the wearable device 104 and the computing device 102 can emit a sound (e.g., voice frequency or ultrasound). If the other of the wearable device 104 and the computing device 102 detects the sound, then the wearable device 104 is in close proximity to the computing device 102.

By way of another example, both the wearable device 104 and the computing device 102 can detect various sounds or motions. The wearable device 104 sends to the computing device 102 an indication of the sounds or motions that the wearable device 104 detects. The wearable device proximity detection module 218 compares the sounds or motions that the wearable device 104 detected to the sounds or motions that the computing device 102 detects and determines that the wearable device 104 is in close proximity if the wearable device 104 detects the same sounds or motions as the computing device 102 detects.

Although the wearable device proximity detection module 218 is illustrated as being part of the computing device 102, additionally or alternatively the wearable device proximity detection module 218 can be implemented on the wearable device 104.

The wearable device 104 stores VPN configuration information for the user, which includes the user's VPN credentials 114 for each of one or more remote VPN devices, as discussed above. The VPN configuration information also includes the VPN engagement rules 116 that are applied to determine when the computing device 102 is to establish and use a VPN connection.

In one or more embodiments, the engagement rules 116 include a safe networks list identifying networks that are deemed to be safe so the computing device 102 need not establish a VPN connection when connected to such networks. For example, the safe networks list can identify the name of a user's work network and the name of a user's home network (e.g., the service set identifier (SSID) of the network in the user's house or the basic service set identifier (BSSID) of wireless access points in the user's house). If the computing device 102 is connected to either of these networks then a VPN connection need not be established because the user's work network and the user's home network are deemed to be safe (e.g., the user need not worry about someone intercepting information being communicated to and from the computing device 102 using the network).

Additionally or alternatively, the engagement rules 116 include a safe locations list identifying locations that are deemed safe so the computing device 102 need not establish a VPN connection when at such locations. These safe locations can be, for example, locations that the user has previously been in or visited (e.g., with one or both of the wearable device 104 and the computing device 102) and identified (e.g., by the user) as being safe. Locations can be identified in various manners, such as by geographic coordinates or signals received by the computing device 102. For example, the safe locations list can identify locations by GPS coordinates that are deemed to be safe. By way of another example, the safe locations list can identify Wi-Fi signals (e.g., using their SSIDs or BSSIDs) that are deemed to be safe. By way of another example, the safe locations list can identify other devices from which the computing device 102 receives signals (e.g., devices that the computing device 102 is paired with) indicating locations that are deemed to be safe. E.g., the computing device 102 can be paired (e.g., using Bluetooth pairing) with the stereo in the user's car, and when the computing device 102 is within communication range of that stereo the location of the user is deemed to be safe (even if the car is moving).

Additionally or alternatively, the engagement rules 116 include an applications list identifying applications on the computing device 102 that are to use a trusted connection to communicate data to a remote device. A trusted connection refers to a VPN connection, or a network or location that is otherwise deemed safe (e.g., a network on the safe networks list or a location on the safe locations list). Some applications may be used to communicate confidential information whereas other applications may not. Accordingly, the applications that are used to communicate confidential information are identified on the applications list so that a trusted connection is used to communicate data to a remote device when one of those applications is launched (or is the application being actively used by the user on the computing device 102). Alternatively, the applications that are not used to communicate confidential information can be identified on the application list.

The VPN engagement rules 116 can include various additional engagement rules that specify criteria for whether to have the computing device 102 establish and use a VPN connection, how to establish or use a VPN connection, and so forth. For example, the engagement rules 116 can include network priority rankings indicating which of multiple networks the computing device 102 can connect to as the network to use for establishing a VPN connection. By way of another example, the engagement rules 116 can include time criteria indicating times of the day or days of the week when VPN connections are (or alternatively are not) to be established.

The VPN configuration information management module 212 facilitates creation of the VPN credentials 114 and the VPN engagement rules 116. For example, the VPN configuration information management module 212 displays a user interface allowing the user to input VPN credentials 114 and specify engagement rules 116. This user interface can be implemented in various manners, for example by displaying a list of applications on the computing device 102 and the user can specify (e.g., by touching an application in the list, by selecting buttons or check boxes associated with the applications in the list, and so forth) which applications are to be on the applications list. By way of another example, the VPN configuration information management module 212 may display a list of network identifiers that the computing device 102 has been connected to in the past and the user can specify (e.g., by touching a network identifier in the list, by selecting buttons or check boxes associated with the network identifiers in the list, and so forth) which networks are to be on the safe networks list. Similarly, the VPN configuration information management module 212 may display a list of identifiers of locations that the computing device 102 has been in in the past and the user can specify (e.g., by touching a location identifier in the list, by selecting buttons or check boxes associated with the location identifiers in the list, and so forth) which locations are to be on the safe locations list.

Additionally or alternatively, the engagement rules 116 can be specified in other manners. For example, the VPN configuration information management module 212 can obtain a default set of engagement rules. This set of default engagement rules can be obtained from a local storage device (e.g., storage device 204) or a remote storage device (e.g., the storage device 224 or via the network 108 of FIG. 1).

It should be noted that in one or more embodiments the VPN engagement rules 116 are optional. In such embodiments the computing device 102 establishes and uses the VPN connection in response to the wearable device 104 being worn by the user, the user being in close proximity to the computing device, and the user being authenticated to at least one of the wearable device 104 and the computing device 102.

Although illustrated as being included in the wearable device 104, additionally or alternatively the VPN configuration information management module 212 can be implemented at least in part on the computing device 102. In such situations at least some of the VPN credentials 114 and/or the VPN engagement rules 116 are specified by the user to the computing device 102, which communicates the specified VPN credentials and/or VPN engagement rules to the wearable device 104.

The VPN configuration module 118 manages the transfer of the VPN credentials 114 to the computing device 102 at the appropriate times. The VPN configuration module 118 receives or obtains input from the wear status determination module 206 indicating whether the wearable device 104 is being worn by a user, input from the wearable device proximity detection module 218 indicating whether the wearable device 104 is in close proximity to the computing device 102, and input from one or both of the user authentication module 208 and the user authentication module 216 indicating whether the user has been authenticated to at least one of the wearable device 104 and the computing device 102. In one or more embodiments, VPN configuration module 118 communicates the VPN credentials 114 to the computing device 102 only in response to determining that the wearable device 104 is being worn by the user, that the wearable device is in close proximity to the computing device, and that the user has been authenticated to at least one of the wearable device and the computing device. These determinations can be made by the wearable device 104 itself, by the computing device 102 (which notifies the wearable device 104 of the determinations), or by a combination thereof. The timing of the transfer of the VPN credentials 114 to the computing device 102 can vary based on the engagement rules 116 as discussed in more detail below.

The engagement rules 116 are applied based on one or both of the context of the computing device 102 and the context of the wearable device 104. The computing device context refers to the environment or setting of the computing device 102. The wearable device context refers to the environment or setting of the wearable device 104.

The computing device context can include any of a variety of different information used to determine whether an engagement rule is satisfied. For example, the computing device 102 context can include an identifier of a network the computing device 102 is connected to or can connect to, a location of the computing device 102, a current time at the computing device 102, and so forth. The computing device 102 being connected to a network refers to the computing device 102 being able to send and receive data over the network. The wearable device context can also include any of a variety of different information used to determine whether an engagement rule is satisfied. For example, the wearable device context can include a location of the wearable device 104, a current time at the wearable device 104, and so forth.

In one or more embodiments, the VPN configuration module 118 of the wearable device 104 applies the engagement rules 116. The VPN configuration module 118 can obtain the wearable device context from sensors or modules in the wearable device 104, or from other sensors or devices providing data to the wearable device 104. The VPN configuration module 118 can obtain the computing device context from the computing device 102, or from other sensors or devices providing data to the computing device 102. The various engagement rules 116 are applied to one or both of the computing device context and the wearable device context. For example, if the computing device 102 is connected to a network on the safe networks list, then a VPN connection is not established. However, if the computing device 102 is connected to a network that is not on the safe networks list, then a VPN connection is established. By way of another example, if the computing device 102 is at a location on the safe locations list, then a VPN connection is not established. However, if the computing device 102 is at a location that is not on the safe locations list, then a VPN connection is established.

Any of a variety of different logical operators can be used to combine the various engagement rules 116. For example, do not establish a VPN connection if the computing device is coupled to a network on the safe networks list or the computing device is in a safe location. However, establish a VPN connection if the computing device is not coupled to a network on the safe networks list and the computing device is not in a safe location. By way of another example, do not establish a VPN connection if the current time is between 7:00 pm and 5:00 am. However, do establish a VPN connection if the time is between 5:00 am and 7:00 pm, unless the computing device is coupled to a network on the safe networks list.

If the VPN configuration module 118 determines that a VPN connection is to be established, the VPN configuration module 118 communicates an indication to the computing device 102 to establish and use a VPN connection. The VPN configuration module 118 also communicates the VPN credentials 114 to the computing device 102. The computing device 102 then establishes and uses the VPN connection as discussed in more detail below.

In one or more embodiments, the VPN client control system 110 of the computing device 102 applies the engagement rules 116. The VPN client control system 110 can obtain the computing device context from sensors or modules in the computing device 102, or from other sensors or devices providing data to the computing device 102. The VPN client control system 110 can obtain the wearable device context from the wearable device 104, or from other sensors or devices providing data to the wearable device 104. The various engagement rules 116 are applied to one or both of the computing device context and the wearable device context. The VPN client control system 110 applies the engagement rules 116 in the same manner as discussed above regarding the VPN configuration module 118 applying the engagement rules 116.

If the VPN client control system 110 determines that a VPN connection is to be established, the VPN client control system 110 sends a request for the VPN credentials to the wearable device 104. In response, VPN configuration module 118 returns the VPN credentials 114 to the computing device 102. The VPN configuration module 118 also communicates the VPN credentials 114 to the computing device 102. The computing device 102 then establishes and uses the VPN connection as discussed in more detail below. Additionally or alternatively, the VPN configuration module 118 can send the VPN credentials 114 to the computing device 102 along with the VPN engagement rules 116. This avoids the computing device 102 needing to request the VPN credentials 114 after the engagement rules 116 have been applied.

In some situations the wearable device 104 stores different VPN credentials 114 for each of multiple VPN endpoint devices, allowing VPN connections to be established with multiple different VPN endpoint devices. In such situations the VPN credentials 114 that are used to establish the VPN connection can be determined in a variety of different manners. In one or more embodiments, the user is prompted (e.g., at the wearable device 104 or the computing device 102) to identify the desired VPN endpoint device. For example, a list of VPN endpoint devices for which the wearable device 104 has VPN credentials can be displayed and the user can select a VPN endpoint device from the list. The VPN credentials 114 corresponding to the selected VPN endpoint device are used to establish the VPN connection.

Additionally or alternatively, the VPN credentials 114 that are used to establish the VPN connection can be determined automatically. For example, an application that is launched may be associated with a particular VPN endpoint device, and the VPN credentials 114 for that particular VPN endpoint device are used to establish the VPN connection. This association may be maintained, for example, by an operating system of the computing device 102, as metadata of the application, and so forth. By way of another example, the wearable device 104 may have a default VPN endpoint device (e.g., specified by the owner or an administrator of the wearable device 104) and the VPN credentials 114 for the default VPN endpoint device are used to establish the VPN connection.

In one or more embodiments, in situations where the wearable device 104 stores VPN credentials 114 for multiple VPN endpoint devices, the same engagement rules 116 can apply to all VPN endpoint devices. Thus, the same engagement rules 116 are applied to determine whether to establish and us a VPN connection. Additionally or alternatively, in situations where the wearable device 104 stores VPN credentials 114 for multiple VPN endpoint devices, different engagement rules 116 can correspond to different VPN endpoint devices or to different VPN credentials 114. Thus, different engagement rules 116 can be used for different VPN endpoint devices.

It should be noted that in some situations the computing device is connected to, or can connect to, multiple networks. Which of multiple networks to use to establish the VPN connection can be determined in different manners. In one or more embodiments, which network to use to establish the VPN connection is specified by the engagement rules 116. If the wearable device 104 is applying the engagement rules 116 then the wearable device 104 provides an indication to the computing device 102 of the network to use to establish the VPN connection (e.g., along with the VPN credentials 114).

Additionally or alternatively, the computing device 102 can choose a network using any of a variety of different criteria (e.g., a network the computing device 102 is already connected to, a network having the strongest signal strength, a network that is not a metered connection, and so forth). Additionally or alternatively, the wearable device 104 or computing device 102 can query the user to select one of the multiple networks. For example, a list of networks that the computing device 102 is connected to, or can connect to, can be displayed and the user can select a network from the list.

The VPN client control system 110 establishes a VPN connection to a VPN endpoint device (e.g., VPN endpoint device 106 of FIG. 1) using the VPN credentials 114 received from the wearable device 104. The network transceiver 220 manages communication between the computing device 102 and remote devices (e.g., the VPN endpoint device 106 of FIG. 1) over the network 108. The network transceiver 220 can implement any of a variety of public and/or proprietary communication technologies, including wired or wireless communication technologies.

The VPN client control system 110 continues to monitor that the wearable device 104 is being worn by the user, that the wearable device 104 is in close proximity to the computing device 102, and that the user is authenticated to both the wearable device 104 and the computing device 102 (or authenticated to only one of the wearable device 104 and the computing device 102 if the wearable device 104 is in close proximity to the computing device 102). The VPN client control system 110 terminates the VPN connection in response to the wearable device no longer being worn by the user, or the wearable device 104 no longer being in close proximity to the computing device 102, or the user no longer being authenticated to both the wearable device 104 and the computing device 102.

It should be noted that once the user is authenticated to one or both of the wearable device 104 and the computing device 102, the user need not re-authenticate himself or herself as long as the wearable device 104 continues to be worn by the user. For example, the wearable device 104 is monitored (e.g., by the wear status determination module 206) via motion (e.g., a continuous wearability sensor). Once the wearable device 104 is detected as being worn and motion or micro motion is taking place, the user authenticates himself or herself to at least one of the wearable device 104 and the computing device 102. As long as the wearable device 104 remains worn, the user need not be re-authenticated, and the VPN connection remains. However, if the wearable device 104 ceases to be detected as being worn (e.g., the wearable device 104 is lost or no motion is detected), the VPN client control system 110 terminates the VPN connection.

The VPN client control system 110 also continues to monitor the wearable device context and the computing device context. In response to a change in either the wearable device context or the computing device context, the VPN client control system 110 (or the VPN configuration module 118) verifies that the engagement rules 116 are still being complied with. The VPN client control system 110 makes any appropriate changes based on the change in wearable device context or computing device context as well as the engagement rules 116. For example, if the computing device 102 has moved to a location on the safe locations list, then the VPN client control system 110 can terminate the VPN connection. By way of another example, if the computing device 102 has moved and is no longer connected to a network on the safe networks list, then the VPN client control system 110 establishes a VPN connection.

The VPN client control system 110 optionally terminates the VPN connection at other times as well. For example, if the VPN connection was established in response to launching of an application or program on the computing device 102 that communicates data over a network, then the VPN connection is terminated in response to no application or program that communicates data over a network running on the computing device 102.

In one or more embodiments, the user can override the determination to terminate a VPN connection. The user can override such a determination in various manners, such as by providing additional authentication to the wearable device 104 or the computing device 102 (e.g., additional authentication data, additional authentication data for use by one or more additional authentication mechanisms).

In one or more embodiments, the VPN client control system 110 deletes the VPN credentials from the computing device 102 in response to terminating the VPN connection. Additionally or alternatively, the computing device 102 can maintain the VPN credentials and only delete the VPN credentials in response to other events, such as the wearable device no longer being worn by the user, the wearable no longer being in close proximity to the computing device, or the user no longer being authenticated to both the wearable device and the computing device. This enhances security by keeping the VPN credentials at the computing device 102 for only as long as they are being (or may be) used.

If communication of data over a trusted connection is needed but the VPN connection is not established (and the computing device 102 is not connected to a network or is not at a location that is otherwise deemed safe), then the computing device 102 delays communicating the data until a VPN connection can again be established. Whether communication of data over a trusted connection is needed can be determined in a variety of different manners. In one or more embodiments, applications that are identified on an applications list as being used to communicate confidential information are deemed to need to communicate data over a trusted connection. Accordingly, if an application that is identified on the applications list attempts to communicate data over a network, a trusted connection is needed. Additionally or alternatively, the user can be queried at the wearable device 104 or the computing device 102 in response to an application or program attempting to communicate data over a network. The user is prompted to indicate whether the attempted communication needs to occur over a trusted connection.

The computing device 102 can delay communicating the data until a VPN connection can again be established (or the computing device 102 is connected to a network or is at a location that is otherwise deemed safe) in a variety of different manners. For example, an operating system running on the computing device 102 can terminate access to the network transceiver 220 for one or more applications or programs attempting to communicate data that needs to occur over a trusted connection. By way of another example, the VPN client control system 110 can notify an application or program attempting to communicate data that needs to occur over a trusted connection to cease such data communication attempts until notified to resume the attempts. The VPN client control system 110 then notifies the application or program that it can resume such communication attempts when the VPN connection is established (or the computing device 102 is connected to a network or is at a location that is otherwise deemed safe).

It should be noted that although the computing device 102 delays communicating data that needs a trusted connection, data that does not need a trusted connection is not delayed. Rather, such data can be communicated via any network that the computing device 102 is connected to without establishing a VPN connection.

In one or more embodiments, the wearable device 104 includes a switch that toggles the VPN behavior between on and off (VPN functionality is enabled and disabled, respectively). The switch can be a physical switch (e.g., a button on the wearable device 104) or an application based switch (e.g., a user selectable button displayed on a screen of the wearable device 104, a gesture input to a touchscreen of the wearable device 104). When the VPN behavior is on (VPN functionality is enabled), the computing device 102 establishes and uses VPN connections as discussed herein. However, when the VPN behavior is off (VPN functionality is disabled), the computing device 102 does not establish VPN connections and no check for whether data is being communicated over a trusted connection is made.

In one or more embodiments, the wearable device 104 includes a switch that allows the user to select from multiple VPN endpoint devices. The switch can be a physical switch (e.g., a button on the wearable device 104) or an application based switch (e.g., user selectable buttons displayed on a screen of the wearable device 104). The switch allows the user to specify a default VPN endpoint device for the wearable device 104 to be used for VPN connections.

In one or more embodiments, the wearable device 104 includes a switch that allows the user to selected from multiple use profiles. The switch can be a physical switch (e.g., a button on the wearable device 104) or an application based switch (e.g., user selectable buttons displayed on a screen of the wearable device 104). The user can establish any number of use profiles he or she desires. For example, the user may establish a work profile and a personal profile. Each profile can be associated with different VPN endpoint devices, can have different VPN credentials, can have different engagement rules, and so forth.

Figure 3:
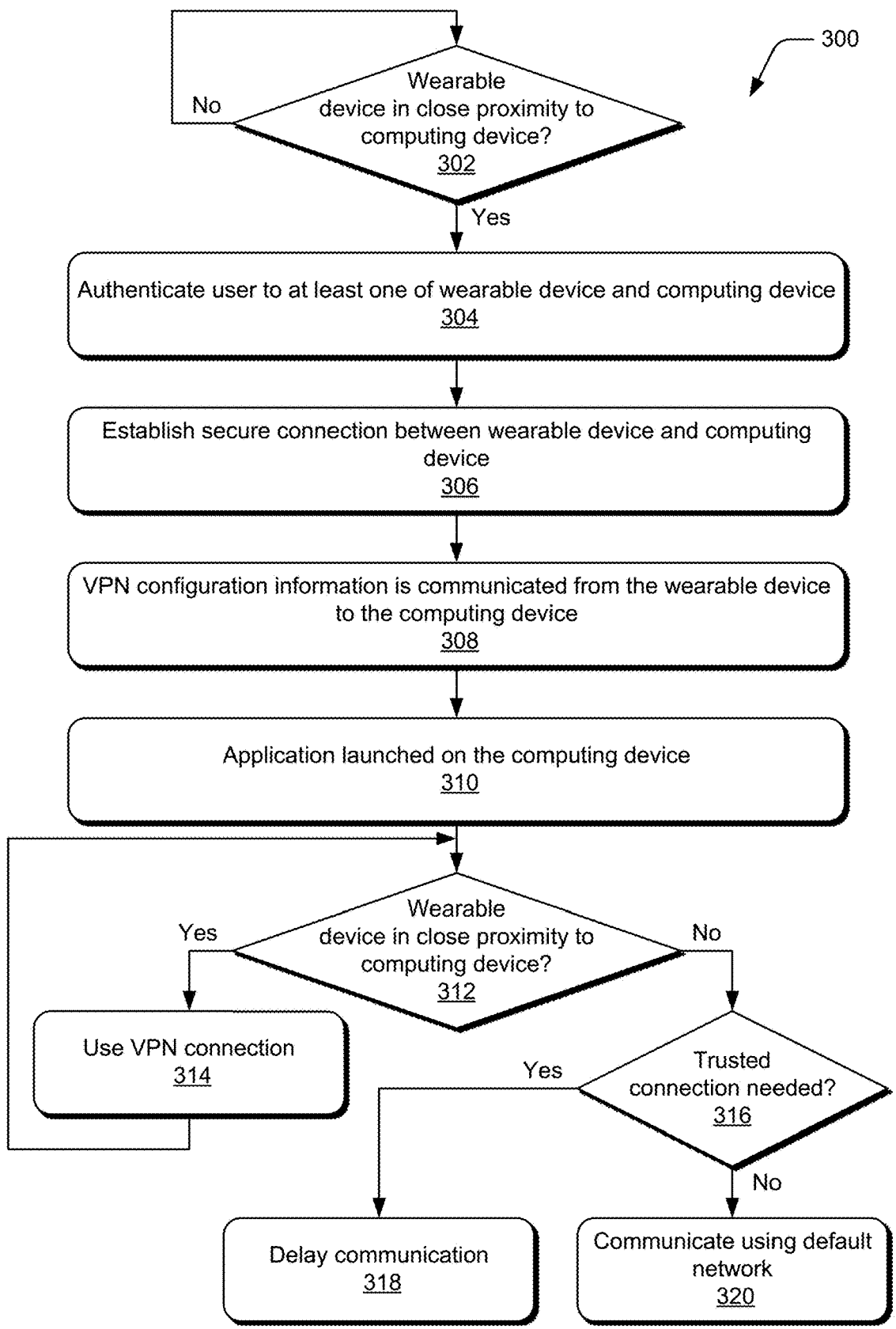
FIG. 3 illustrates an example process for implementing the techniques discussed herein in accordance with one or more embodiments.

FIG. 3 illustrates an example process 300 for implementing the techniques discussed herein in accordance with one or more embodiments. Process 300 is carried out by a wearable device and a computing device, such as the wearable device 104 and the computing device 102 of FIG. 1 or FIG. 2, and can be implemented in software, firmware, hardware, or combinations thereof. Process 300 is shown as a set of acts and is not limited to the order shown for performing the operations of the various acts.

In process 300, a check is made as to whether the wearable device is in close proximity to the computing device (act 302). This check continues to be made at regular or irregular intervals until the wearable device is in close proximity to the computing device. This check also includes verifying that the wearable device is being worn by the user.

In response to the wearable device being in close proximity to the computing device, the user is authenticated to at least one of the wearable device and the computing device (act 304). This authentication is performed using any of various authentication data as discussed above.

A secure connection is established between the wearable device and the computing device (act 306). This secure connection can be established in various manners, such as by using encryption.

VPN configuration information is communicated from the wearable device to the computing device (act 308). In one or more embodiments, this VPN configuration information includes VPN credentials and VPN engagement rules. Additionally or alternatively, this configuration information includes the VPN credentials but not the VPN engagement rules. This configuration information optionally includes additional information, such as an indication of a network or endpoint device to connect to.

An application is then launched on the computing device (act 310). In one or more embodiments, the application that is launched is an application that needs to communicate data over a trusted connection.

A check is then made to verify that the wearable device is still in close proximity to the computing device (act 312). This check also includes verifying that the wearable device is still being worn by the same user that is authenticated to the wearable device and the computing device. Additionally or alternatively, if the wearable device was determined to be in close proximity to the computing device in act 302 not long ago (e.g., less than a threshold amount of time, such as 5 seconds), then the check need not be made again in act 312.

If the wearable device is still in close proximity to the computing device (and the wearable device is still being worn by the same user that is authenticated to the wearable device and the computing device) and the computing device is not connected to a network or at a location that is otherwise deemed safe (e.g., a network on the safe networks list or a location on the safe locations list), the computing device uses a VPN connection to communicate data to a VPN endpoint device (act 314). If the VPN connection has not already been established, then the VPN connection is also established in act 314.

A check continues to be made to verify that the wearable device is still in close proximity to the computing device and the wearable device is still being worn by the same user that is authenticated to the wearable device and the computing device (act 312). Additionally or alternatively, if the user wears the wearable device and is authenticated, then in act 312 a check can continue to be made to verify that the wearable device is still in close proximity to the computing device and being worn, the user need not be reauthenticated as discussed above. These checks can be made at regular or irregular intervals, such as every particular number of seconds (e.g., 10 seconds or 30 seconds), or in response to other events (e.g., a change in computing device context or wearable device context).

If the wearable device is not in close proximity to the computing device (or the wearable device is not still being worn by the same user that is authenticated to the wearable device and the computing device), then a check is made whether trusted connection is needed (act 316). If a trusted connection is needed, then communication is delayed (act 318). Communication is delayed until, for example, a VPN connection can again be established. However, if a trusted connection is not needed then data is communicated over a default network (act 320). The default network refers to any network that the computing device is connected to or can connect to.

It should be noted that the order shown for performing the operations of the various acts can be changed. For example, the VPN configuration information can be communicated from the wearable device to the computing device after the application is launched on the computing device in act 310, or after the wearable device is verified to be in close proximity to the computing device in act 312.

Figure 4:
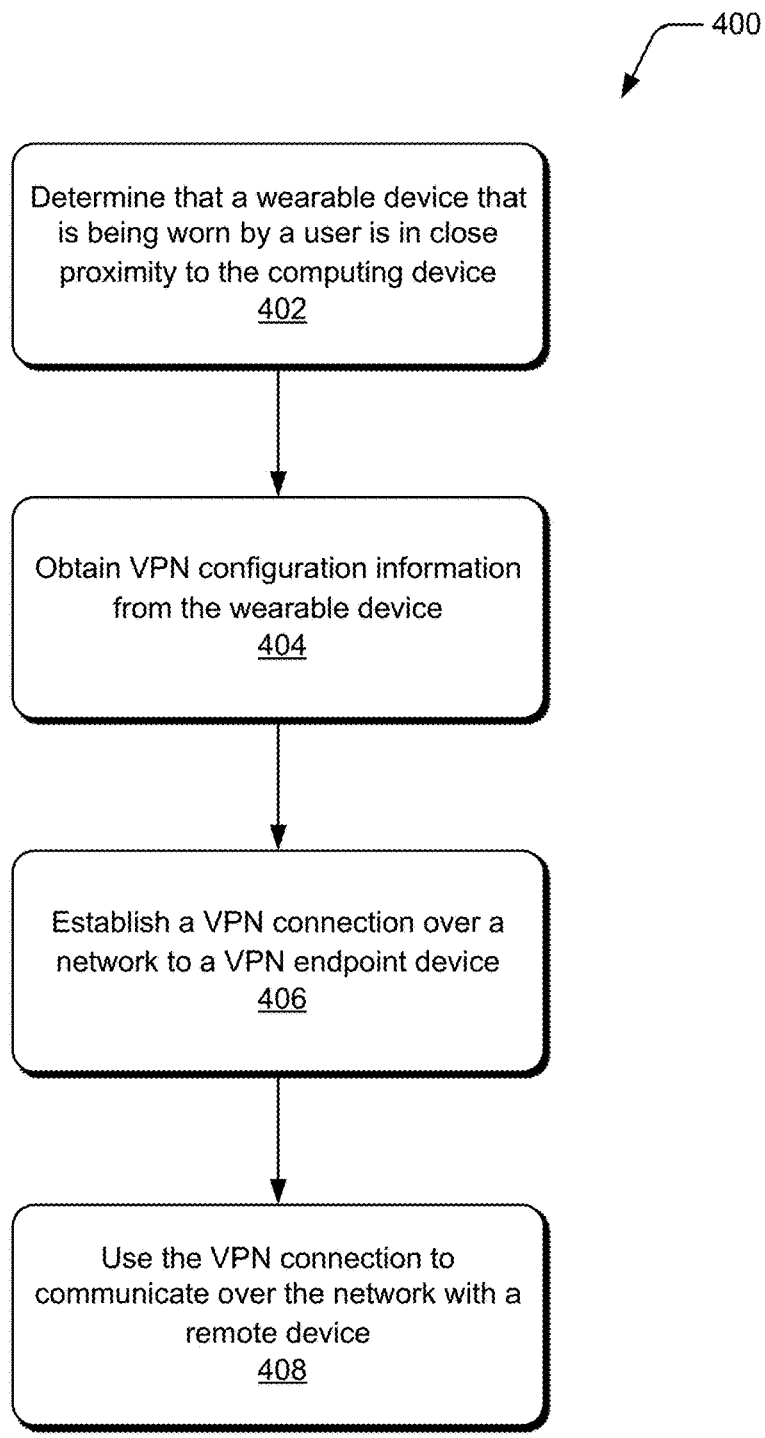
FIG. 4 illustrates another example process for implementing the techniques discussed herein in accordance with one or more embodiments.

FIG. 4 illustrates another example process 400 for implementing the techniques discussed herein in accordance with one or more embodiments. Process 400 is carried out by a computing device, such as computing device 102 of FIG. 1 or FIG. 2, and can be implemented in software, firmware, hardware, or combinations thereof. Process 400 is shown as a set of acts and is not limited to the order shown for performing the operations of the various acts.

A determination is made that a wearable device that is being worn by a user is in close proximity to the computing device (act 402). The user wearing the device is a user that is authenticated to at least one of the wearable device and the computing device.

In response to determining that the wearable device that is being worn by the user is in close proximity to the computing device, VPN configuration information from the wearable device is obtained (act 404). The VPN configuration information can include various information as discussed above, such as VPN credentials and optionally VPN engagement rules.

In response to determining that the wearable device that is being worn by the user is in close proximity to the computing device, a VPN connection over a network to a VPN endpoint device is established using the VPN configuration information (act 406). The VPN endpoint device can be, for example, a VPN server or a VPN router.

The VPN connection is used to communicate over the network with a remote device (act 408). The remote device can be a VPN server to which the VPN connection was established in act 406, or a device (such as a server or other computing device) coupled to a VPN router to which the VPN connection was established in act 406.

Figure 5:
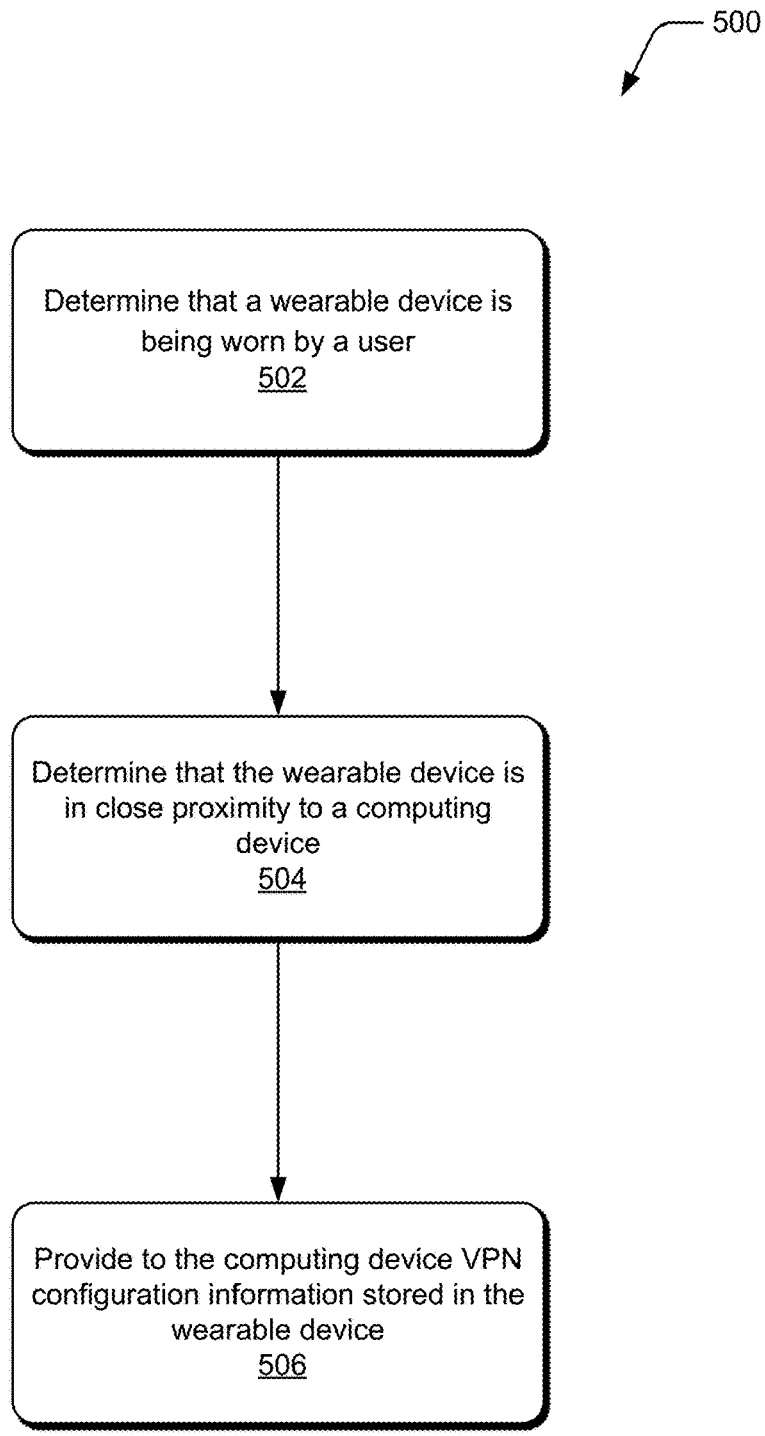
FIG. 5 illustrates another example process for implementing the techniques discussed herein in accordance with one or more embodiments.

FIG. 5 illustrates another example process 500 for implementing the techniques discussed herein in accordance with one or more embodiments. Process 500 is carried out by a wearable device, such as wearable device 104 of FIG. 1 or FIG. 2, and can be implemented in software, firmware, hardware, or combinations thereof. Process 500 is shown as a set of acts and is not limited to the order shown for performing the operations of the various acts.

A determination is made that the wearable device is being worn by a user (act 502). This determination can be made based on data received from sensors in the wearable device or sensors external to the wearable device.

A determination is also made that the wearable device is in close proximity to a computing device (act 504). The user wearing the device is a user that is authenticated to at least one of the wearable device and the computing device.

In response to determining that the wearable device is being worn by the user and is in close proximity to the computing device, VPN configuration information stored in the wearable device is provided to the computing device (act 506). The VPN configuration information can include various information as discussed above, such as VPN credentials and optionally VPN engagement rules. The VPN configuration information allows the computing device to establish and use a VPN connection over a network to a VPN endpoint device.

Figure 6:
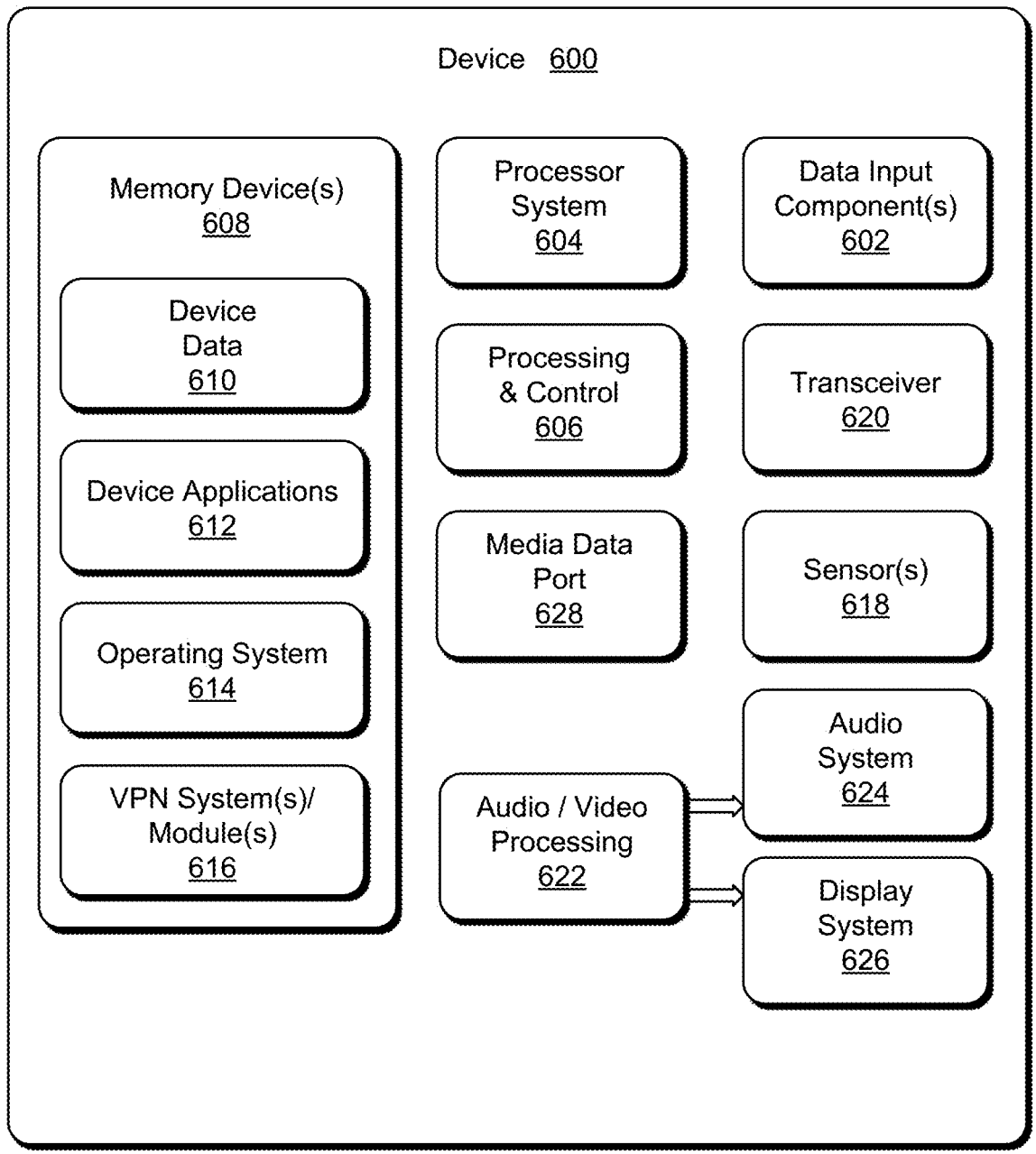
FIG. 6 illustrates various components of an example electronic device that can be implemented as a computing device as described herein.

FIG. 6 illustrates various components of an example electronic device 600 that can be implemented as a computing device, a wearable device, or a VPN endpoint device as described with reference to any of the previous FIGS. 1-5. The device 600 may be implemented as any one or combination of a fixed or mobile device in any form of a consumer, computer, portable, user, communication, phone, navigation, gaming, messaging, Web browsing, paging, media playback, server, or other type of electronic device.

The electronic device 600 can include one or more data input components 602 via which any type of data, media content, or inputs can be received such as user-selectable inputs, messages, music, television content, recorded video content, and any other type of audio, video, or image data received from any content or data source. The data input components 602 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 602 may also include various other input components such as microphones, touch sensors, keyboards, cameras or other image capture components, and so forth.

The electronic device 600 of this example includes a processor system 604 (e.g., any of microprocessors, controllers, and the like) or a processor and memory system (e.g., implemented in a system on a chip), which processes computer executable instructions to control operation of the device 600. A processor system 604 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 600 can be implemented with any one or combination of software, hardware, firmware, or fixed logic circuitry implemented in connection with processing and control circuits that are generally identified at 606. Although not shown, the electronic device 600 can include a system bus or data transfer system that couples the various components within the device 600. A system bus can include any one or combination of different bus structures such as a memory bus or memory controller, a peripheral bus, a universal serial bus, or a processor or local bus that utilizes any of a variety of bus architectures.

The electronic device 600 also includes one or more memory devices 608 that enable data storage such as random access memory, nonvolatile memory (e.g., read only memory, flash memory, erasable programmable read only memory, electrically erasable programmable read only memory, etc.), and a disk storage device. A memory device 608 provides data storage mechanisms to store the device data 610, other types of information or data (e.g., data backed up from other devices), and various device applications 612 (e.g., software applications). For example, an operating system 614 can be maintained as software instructions with a memory device and executed by the processor system 604.

In one or more embodiments the electronic device 600 includes a VPN system(s) or module(s) 616. The VPN system(s) or module(s) 616 can include different functionality based on the type of the electronic device 600. For example, if the electronic device 600 is a wearable device (e.g., wearable device 104 of FIG. 1 or FIG. 2), then the VPN system(s) or module(s) 616 can be one or more of a VPN configuration module 118, a wear status determination module 206, a user authentication module 208, and a VPN configuration information management module 212. By way of another example, if the electronic device 600 is a computing device (e.g., computing device 102 of FIG. 1 or FIG.

2), then the VPN system(s) or module(s) 616 can be one or more of a VPN client control system 110, a user authentication module 216, and a wearable device proximity detection module 218. By way of another example, if the electronic device 600 is a VPN endpoint device (e.g., VPN endpoint device 106 of FIG. 1 or FIG. 2), then the VPN system(s) or module(s) 616 can be a VPN server control system 112. Although represented as a software implementation, the VPN system(s) or module(s) 616 may be implemented as any form of a control application, software application, signal processing and control module, firmware that is installed on the device 600, a hardware implementation of the system 112, and so on.

It should be noted that in some situations, at least some of the processing performed by the electronic device 600 can be offloaded to a distributed system, such as over a "cloud" service. Such a cloud service includes one or more electronic devices to implement at least some of processing discussed herein as being performed by the electronic device 600.

The electronic device 600 also optionally includes one or more sensors 618. These sensors 618 can be any of a variety of different types of sensors discussed above. For example, sensors 618 can be sensors detecting location or context of the electronic device 600, imaging sensors (e.g., cameras or other image capture devices), sound sensors (e.g., microphones), temperature sensors, motion sensors, and so forth.

Moreover, in one or more embodiments various techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 608.

The electronic device 600 also includes a transceiver 620 that supports wireless and/or wired communication with other devices or services allowing data and control information to be sent as well as received by the device 600. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, Bluetooth protocols, NFC protocols, USB protocols, and so forth.

The electronic device 600 can also include an audio or video processing system 622 that processes audio data or passes through the audio and video data to an audio system 624 or to a display system 626. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 628. In implementations the audio system or the display system are external components to the electronic device. Alternatively or in addition, the display system can be an integrated component of the example electronic device, such as part of an integrated touch interface. For example, the display system 626 can be configured as any suitable type of display screen, such as an organic light-emitting diode (OLED) display, active matrix OLED display, liquid crystal display (LCD), in-plane shifting LCD, projector, and so forth.

Although embodiments of techniques for implementing controlling computing device virtual private network usage with a wearable device have been described in language specific to features or methods, the subject of the appended claims is not necessarily limited to the specific features or methods described. Rather, the specific features and methods are disclosed as example implementations of techniques for controlling computing device virtual private network usage with a wearable device.

What is claimed is:

1. A method implemented in a computing device, the method comprising:
   determining that a wearable device that is being worn by a user is within a threshold distance of the computing device, the user being authenticated to at least one of the wearable device and the computing device;
   obtaining from the wearable device, in response to determining that the wearable device is within the threshold distance of the computing device, virtual private network credentials to access a virtual private network endpoint device, the virtual private network credentials including a user name and password;
   establishing, in response to determining that the wearable device is within the threshold distance of the computing device, a virtual private network connection over a network to the virtual private network endpoint device using the virtual private network credentials;
   using the virtual private network connection to communicate over the network with a remote device;
   determining, after an amount of time, that the wearable device is no longer within the threshold distance of the computing device; and
   terminating, in response to determining that the wearable device is no longer within the threshold distance of the computing device, the virtual private network connection.

2. The method described in claim 1, the user being authenticated to at least one of the wearable device and the computing device comprising determining that the user of the wearable device and the computing device is a same user, and determining that the user is authenticated to access the wearable device as well as access the computing device.

3. The method described in claim 1, the method further comprising:
   determining, after establishing the virtual private network connection, that the wearable device is no longer being worn by the user; and
   terminating the virtual private network connection in response to determining that the wearable device is no longer being worn by the user.

4. The method described in claim 1, the method further comprising:
   determining, after terminating the virtual private network connection, whether a requested communication is to use a trusted connection; and delaying the requested communication in response to the virtual private network connection being terminated and determining that the requested communication is to use a trusted connection.

5. The method described in claim 1, the method further comprising:
determining, after terminating the virtual private network connection, whether a requested communication is to use a trusted connection; and
communicating over the network without using the virtual private network connection in response to the virtual private network connection being terminated and determining that the requested communication is not to use a trusted connection.

6. The method described in claim 5, the method further comprising:
sending, to the wearable device, a context of the computing device including an identification of the network; and
receiving, from the wearable device, an indication of whether to establish the virtual private network connection and use the virtual private network connection.

7. The method described in claim 1, the method further comprising obtaining a set of engagement rules from the wearable device, the set of engagement rules identifying a context under which the computing device is to establish the virtual private network connection and use the virtual private network connection to communicate over the network, the obtaining the set of engagement rules including obtaining the set of engagement rules in response to any one or more of: a new engagement rule is generated, an engagement rule is changed, when the wearable device is in close proximity to the computing device, when a context of the wearable device changes, when a context of the computing device changes, when an application on the computing device is launched, and when a network that the computing device is connected to changes.

8. The method described in claim 1, the method further comprising obtaining a set of engagement rules from the wearable device, the set of engagement rules identifying a context under which the computing device is to establish the virtual private network connection and use the virtual private network connection to communicate over the network, the set of engagement rules including an applications list identifying one or more applications for which communication is to use a trusted connection, the establishing the virtual private network connection comprising establishing the virtual private network connection only if an application requesting to communicate over the network is identified on the applications list as being an application for which communication is to use a trusted connection, and the using the virtual private network connection to communicate over the network comprising using the virtual private network connection to communicate over the network only if the application requesting to communicate over the network is identified on the applications list as being an application for which communication is to use a trusted connection.

9. The method described in claim 1, the method further comprising:
obtaining a set of engagement rules from the wearable device, the set of engagement rules identifying a context under which the computing device is to establish the virtual private network connection and use the virtual private network connection to communicate over the network;
identifying a network that the computing device is connected to; and
the set of engagement rules including a safe networks list identifying one or more networks that have been determined to be safe, the establishing the virtual private network connection comprising establishing the virtual private network connection only if the network that the computing device is connected to is not identified in the safe networks list, and the using the virtual private network connection to communicate over the network comprising using the virtual private network connection to communicate over the network only if the network that the computing device is connected to is not identified in the safe networks list.

10. The method described in claim 1, the method further comprising:
obtaining a set of engagement rules from the wearable device, the set of engagement rules identifying a context under which the computing device is to establish the virtual private network connection and use the virtual private network connection to communicate over the network;
identifying a current location of the computing device; and
the set of engagement rules including a safe locations list identifying one or more locations that have been determined to be safe, the establishing the virtual private network connection comprising establishing the virtual private network connection only if the current location of the computing device is not identified in the safe locations list, and the using the virtual private network connection to communicate over the network comprising using the virtual private network connection to communicate over the network only if the current location of the computing device is not identified in the safe locations list.

11. The method described in claim 1, the method further comprising:
determining that the computing device is connected to multiple networks;
communicating a request to the wearable device to select one of the multiple networks;
receiving, from the wearable device in response to the request, a user selected one of the multiple networks; and
the establishing the virtual private network connection comprising establishing the virtual private network connection over the user selected one of the multiple networks, and the using the virtual private network connection to communicate over the network comprising using the virtual private network connection to communicate over the user selected one of the multiple networks.

12. A method implemented in a computing device, the method comprising:
determining that a wearable device that is being worn by a user is within a threshold distance of the computing device, the user being authenticated to at least one of the wearable device and the computing device;
obtaining from the wearable device, while the wearable device is within the threshold distance of the computing device, virtual private network credentials to access a virtual private network endpoint device, the virtual private network credentials including a user name and password;
establishing, while the wearable device is within the threshold distance of the computing device, a virtual private network connection over a network to the virtual private network endpoint device using the virtual private network credentials;
using the virtual private network connection to communicate over the network with a remote device;
determining, after an amount of time, that the wearable device is no longer within the threshold distance of the computing device; and
terminating the virtual private network connection responsive to determining that the wearable device is no longer within the threshold distance of the computing device.

13. The method described in claim 12, the method further comprising obtaining a set of engagement rules from the wearable device, the set of engagement rules identifying a context under which the computing device is to establish and use the virtual private network connection to communicate over the network, the set of engagement rules including an applications list identifying one or more applications for which the virtual private network connection is to be established and used, a safe networks list identifying one or more networks for which the virtual private network connection is not to be established, and a safe locations list identifying one or more locations for which the virtual private network connection is not to be established, the establishing further comprising establishing the virtual private network connection in response to the set of engagement rules indicating the virtual private network connection is to be established.

14. The method described in claim 12, the method further comprising:
determining that the computing device is connected to multiple networks;
communicating a request to the wearable device to select one of the multiple networks;
receiving, from the wearable device in response to the request, a user selected one of the multiple networks; and
the establishing the virtual private network connection comprising establishing the virtual private network connection over the user selected one of the multiple networks, and the using the virtual private network connection to communicate over the network comprising using the virtual private network connection to communicate over the user selected one of the multiple networks.

15. The method described in claim 12, the method further comprising:
obtaining a set of engagement rules from the wearable device, the set of engagement rules identifying a context under which the computing device is to establish the virtual private network connection and use the virtual private network connection to communicate over the network;
identifying a current location of the computing device; and
the set of engagement rules including a safe locations list identifying one or more locations that have been determined to be safe, the establishing the virtual private network connection comprising establishing the virtual private network connection only if the current location of the computing device is not identified in the safe locations list, and the using the virtual private network connection to communicate over the network comprising using the virtual private network connection to communicate over the network only if the current location of the computing device is not identified in the safe locations list.

16. The method described in claim 12, the method further comprising:
obtaining a set of engagement rules from the wearable device, the set of engagement rules identifying a context under which the computing device is to establish the virtual private network connection and use the virtual private network connection to communicate over the network;
identifying a network that the computing device is connected to; and
the set of engagement rules including a safe networks list identifying one or more networks that have been determined to be safe, the establishing the virtual private network connection comprising establishing the virtual private network connection only if the network that the computing device is connected to is not identified in the safe networks list, and the using the virtual private network connection to communicate over the network comprising using the virtual private network connection to communicate over the network only if the network that the computing device is connected to is not identified in the safe networks list.

17. The method described in claim 12, the method further comprising obtaining a set of engagement rules from the wearable device, the set of engagement rules identifying a context under which the computing device is to establish the virtual private network connection and use the virtual private network connection to communicate over the network, the obtaining the set of engagement rules including obtaining the set of engagement rules in response to any one or more of: a new engagement rule is generated, an engagement rule is changed, when the wearable device is in close proximity to the computing device, when a context of the wearable device changes, when a context of the computing device changes, when an application on the computing device is launched, and when a network that the computing device is connected to changes.

18. A computing device comprising:
a wireless transceiver to communicate with a wearable device;
a network transceiver to communicate with a virtual private network endpoint device over a network; and
a processor system that implements a virtual private network control system to:
determine that the wearable device being worn by a user is within a threshold distance of the computing device, the user being authenticated to at least one of the wearable device and the computing device;
obtain from the wearable device, in response to determining that the wearable device is within the threshold distance of the computing device, virtual private network credentials to access a virtual private network endpoint device, the virtual private network credentials including a user name and password;
obtain, from the wearable device, a set of engagement rules that identify a context under which the computing device is to terminate virtual private network connections;
establish, in response to determining that the wearable device is within the threshold distance of the computing device, a virtual private network connection over the network to the virtual private network endpoint device using the virtual private network credentials;
use the virtual private network connection to communicate over the network with a remote device;

determine, after an amount of time, that the wearable device is no longer within the threshold distance of the computing device; and terminate, in response to determining that the wearable device is no longer within the threshold distance of the computing device and in accordance with the set of engagement rules, the virtual private network connection.

19. The computing device described in claim 18, the set of engagement rules identifying a context under which the computing device is to establish and use the virtual private network connection to communicate over the network, the virtual private network control system establishing the virtual private network connection and using the virtual private network connection in accordance with the set of engagement rules.

20. The computing device described in claim 18, the virtual private network control system being further to:

determine, after terminating the virtual private network connection, whether a requested communication is to use a trusted connection; and delay the requested communication in response to the virtual private network connection being terminated and determining that the requested communication is to use a trusted connection.

\* \* \* \* \*